(12) United States Patent
Yamamoto

(10) Patent No.: US 7,960,889 B2
(45) Date of Patent: Jun. 14, 2011

(54) SPLIT CORE AND MANUFACTURING METHOD OF THE SAME, AND STATOR CORE

(75) Inventor: Kazuyuki Yamamoto, Tokyo (JP)

(73) Assignee: Mitsubishi Electronic Corporation, Tokyo (JP)

( * ) Notice: Subject to any disclaimer, the term of this patent is extended or adjusted under 35 U.S.C. 154(b) by 389 days.

(21) Appl. No.: 12/301,242

(22) PCT Filed: May 29, 2007

(86) PCT No.: PCT/JP2007/000569
§ 371 (c)(1),
(2), (4) Date: Nov. 18, 2008

(87) PCT Pub. No.: WO2007/141907
PCT Pub. Date: Dec. 13, 2007

(65) Prior Publication Data
US 2009/0189477 A1  Jul. 30, 2009

(30) Foreign Application Priority Data
Jun. 5, 2006  (JP) .................................. 2006-155514

(51) Int. Cl.
*H02K 1/06* (2006.01)

(52) U.S. Cl. ... 310/216.004; 310/216.007; 310/216.008; 310/216.011; 310/216.012; 310/216.015; 310/216.057; 310/216.069; 310/216.073

(58) Field of Classification Search ........... 310/216.004, 310/216.007–216.008, 216.011–216.012, 310/216.015, 216.57, 216.69–216.073
See application file for complete search history.

(56) References Cited

U.S. PATENT DOCUMENTS

| 6,226,856 | B1 | 5/2001 | Kazama et al. |
| 6,504,284 | B1 | 1/2003 | Kazama et al. |
| 2001/0005933 | A1 | 7/2001 | Kazama et al. |

FOREIGN PATENT DOCUMENTS

| JP | 61 124241 | | 6/1986 |
| JP | 63 299752 | | 12/1988 |
| JP | 63299746 | A * | 12/1988 |
| JP | 6 245414 | | 9/1994 |
| JP | 7 59278 | | 3/1995 |
| JP | 07067272 | A * | 3/1995 |
| JP | 08116637 | A * | 5/1996 |
| JP | 10 155248 | | 6/1998 |
| JP | 2001 128394 | | 5/2001 |
| JP | 2003 9435 | | 1/2003 |
| JP | 2004 173440 | | 6/2004 |
| JP | 2004 320930 | | 11/2004 |
| JP | 2005 102424 | | 4/2005 |

* cited by examiner

*Primary Examiner* — Quyen Leung
*Assistant Examiner* — Jose A Gonzalez Quinones
(74) *Attorney, Agent, or Firm* — Oblon, Spivak, McClelland, Maier & Neustadt, L.L.P.

(57) ABSTRACT

A first laminated body includes first and second laminated groups including respective convex parts alternately disposed. A second laminated body includes third and fourth laminated groups including respective concave parts alternately disposed. The convex part of the first laminated group is shaped to not be inserted into the concave part of the third laminated group and to be inserted into the concave part of the fourth laminated group, from a lamination horizontal direction. The convex part of the second laminated group is shaped to be inserted into the concave part of the third laminated group and the concave part of the fourth laminated group, from the lamination horizontal direction. The convex part of the first laminated group is press-inserted in the concave part of the third laminated group, and the convex part of the second laminated group is inserted in the concave part of the fourth laminated group.

20 Claims, 11 Drawing Sheets

(a)

(b)

(c)

(a)　　　　　　　　　(b)

SPLIT CORE AND MANUFACTURING METHOD OF THE SAME, AND STATOR CORE

TECHNICAL FIELD

The present invention relates to a split core having a concave-convex structure in a divided part, to a manufacturing method of the same, and to a stator core.

BACKGROUND ART

Hitherto, in a motor or a transformer, there is a core having a structure in which thin plate-like silicon steel plates punched by a press are laminated and integrated by caulking or welding. Besides, as a stator of a motor, there is a split core structure in which a core is divided in order to increase the occupation ratio of a winding and to improve the workability of the winding, and this contributes to the miniaturization of the motor and the improvement in performance.

For example, in patent document 1 (JP-A-61-124241), there is a split core having a structure in which a stator of a motor is completely divided into each teeth, and after a winding is provided at the split core, a concave part and a convex part provided in a divided part are coupled to each other, and the stator is formed. Here, there is adopted a division shape according to an object, for example, a split core shape in which a ring-shaped core back is divided and which includes a part of the core back and a teeth part, or a split core shape in which a ring-shaped core back is not divided, and a division is made between the teeth and the core back. In addition to these, as conventional split core structures, for example, there are ones disclosed in following patent document 2 to patent document 6.

Patent document 1: JP-A-61-124241
Patent document 2: JP-A-63-299752
Patent document 3: JP-A-2001-128394
Patent document 4: JP-A-7-59278
Patent document 5: JP-A-2004-173440
Patent document 6: JP-A-2005-102424

DISCLOSURE OF THE INVENTION

Problems that the Invention is to Solve

The patent document 2 (JP-A-63-299752) discloses a structure including a teeth part and a cylindrical yoke part surrounding the teeth part, the end of the teeth part is abutted to the inner diameter side of the yoke part, and the engagement is performed by dovetails and dovetail grooves.

However, when the thickness of the core (core lamination thickness) becomes large, a press-insertion force becomes large, an excessive force is applied to the core, and there is a problem that the shape accuracy of the core, especially the required inner diameter accuracy is reduced.

To this problem, in the patent document 3 (JP-A-2001-128394), a method in which the problem can be solved by devising the detailed shape of a dovetail groove part is proposed. However, in this method, a gap is provided between a concave and a convex part to facilitate the insertion work, and the position fixing of the teeth is realized in a later process of molding the whole stator, and therefore, in the case of a motor in which no mold is required, the teeth position can not be determined. Besides, since the mold process is required, there is a problem that the motor becomes expensive.

Besides, in the patent document 4 (JP-A-7-59278), it shows a structure in which the shape of a concave-convex part is not a dovetail groove shape, an inclined part inclined only in one direction is formed at the end of a convex part, a similar inclined part is provided also at the groove bottom of a concave part, and the concave and the convex part can be easily inserted in the laminating direction. However, in this method, it is necessary that the teeth is inserted and after positioning is made by rotation movement, the teeth is fixed by spot welding or the like, and therefore, there arises a problem that the core accuracy by the welding is reduced by the distortion of the welding, and further, there is a problem that also in this method, the motor becomes expensive by the increase of the manufacture process.

Besides, in the patent document 5 (JP-A-2004-173440), a method in which the width size of a dovetail groove in the peripheral direction is set at two stages is proposed. In this method, the positioning accuracy at the time of press insertion and assembly is eased, and the assembling flexibility can be improved, however, the press-insertion force can not be decreased, and in the case where the number of laminations is increased, the deterioration of core accuracy can not be avoided.

Besides, in the patent document 6 (JP-A-2005-102424), a coupling convex part of a pole piece constituting a magnetic pole laminated body is fitted in a coupling concave part of a yoke piece constituting a yoke laminated body, and a press fixing part in a mode of facing the coupling concave part is formed on the surface of the yoke piece positioned at the surface layer part, so that the yoke laminated body and the magnetic pole laminated body are fixed to each other. However, in this method, there are problems that the design of the press fixing part is difficult, it becomes difficult to realize the die accuracy, and the teeth can not be sufficiently fixed by the fixing of only the surface layer part.

The invention is proposed to solve the problems and has an object to enable reduction of press-insertion force even at the time of assembling a split core having a large number of laminations, and to increase the accuracy of the assembly of the core.

Means for Solving the Problem

A split core according to a first invention is constructed by combining concave and convex parts of a first laminated body and a second laminated body, the first laminated body includes a first laminated group A having a convex part a and a second laminated group B having a convex part b, which are alternately disposed, the second laminated body includes a third laminated group C having a concave part c and a fourth laminated group D having a concave part d, which are alternately disposed, the convex part a of the first laminated group A has a shape that the convex part can not be inserted into the concave part c of the third laminated group C from a lamination horizontal direction and can be inserted into the concave part d of the fourth laminated group D from the lamination horizontal direction, the convex part b of the second laminated group B has a shape that the convex part can be inserted into the concave part c of the third laminated group C and the concave part d of the fourth laminated group D from the lamination horizontal direction, and the convex part a of the first laminated group A is press-inserted in the concave part c of the third laminated group C, and the convex part b of the second laminated group B is inserted in the concave part d of the fourth laminated group D.

In the first invention, the convex part a of the first laminated group A, the convex part b of the second laminated group B, the concave part c of the third laminated group C, and the concave part d of the fourth laminated group D correspond to, for example, a convex part 50*a*, a convex part 50*b*, a concave part 40*c* and a concave part 40*d* in embodiments 1 and 2 described below, correspond to a convex part 50*aa*, a convex part 50*bb*, a concave part 40*cc* and a concave part 40*dd* in embodiment 4 described below, and correspond to a convex part 150*aa*, a convex part 150*bb*, a concave part 140*cc* and a concave part 140*dd* in embodiment 5 described below. Incidentally, the shapes of the convex part a of the first laminated group A, the convex part b of the second laminated group B, the concave part c of the third laminated group C, and the concave part d of the fourth laminated group D are not limited to specific shapes described in the above embodiments, and include various shapes within the scope not departing from the technical gist.

A split core according to a second invention is constructed by combining concave and convex parts of a first laminated body and a second laminated body, the first laminated body includes a first laminated group E having a convex part e and a second laminated group F having a convex part f, which are alternately disposed, the second laminated body includes a third laminated group G having a concave part g and a fourth laminated group H having a concave part h, which are alternately disposed, the convex part e of the first laminated group E has a shape that the convex part can not be inserted into the concave part g of the third laminated group G from a lamination horizontal direction and can be inserted into the concave part h of the fourth laminated group H from the lamination horizontal direction, the convex part f of the second laminated group F has a shape that the convex part can be inserted into the concave part g of the third laminated group G from the lamination horizontal direction and can not be inserted into the concave part h of the fourth laminated group H from the lamination horizontal direction, and the convex part e of the first laminated group E is press-inserted in the concave part g of the third laminated group G, and the convex part f of the second laminated group F is press-inserted in the concave part h of the fourth laminated group H.

In the second invention, the convex part e of the first laminated group E, the convex part f of the second laminated group F, the concave part g of the third laminated group G, and the concave part h of the fourth laminated group H correspond to, for example, a convex part 50*e*, a convex part 50*f*, a concave part 40*g* and a concave part 40*h* in embodiment 3 described below. Incidentally, the shapes of the convex part e of the first laminated group E, the convex part f of the second laminated group F, the concave part g of the third laminated group G, and the concave part h of the fourth laminated group H are not limited to specific shapes described in the above embodiment, and include various shapes within the scope not departing from the technical gist.

EFFECTS OF THE INVENTION

According to the first and the second invention, when the split core is assembled, the concave part and the convex part have only to be press-inserted from the lamination direction by a distance shorter than the total lamination thickness of the split core, and the press-fitting force can be set to be small. As a result, without much increasing the magnetic resistance loss in the divided part, the assembly workability of the split core is made excellent, and the assembly accuracy of the core can be improved.

Besides, according to the second invention, the convex part and the concave part can be combined so as to be press-inserted over the whole lamination range of the split core, the assembly workability is excellently improved, and stronger joining in the divided part becomes possible.

BEST MODE FOR CARRYING OUT THE INVENTION

Hereinafter, the best mode for carrying out the invention will be described with the drawings.

Embodiment 1

Figure 1:
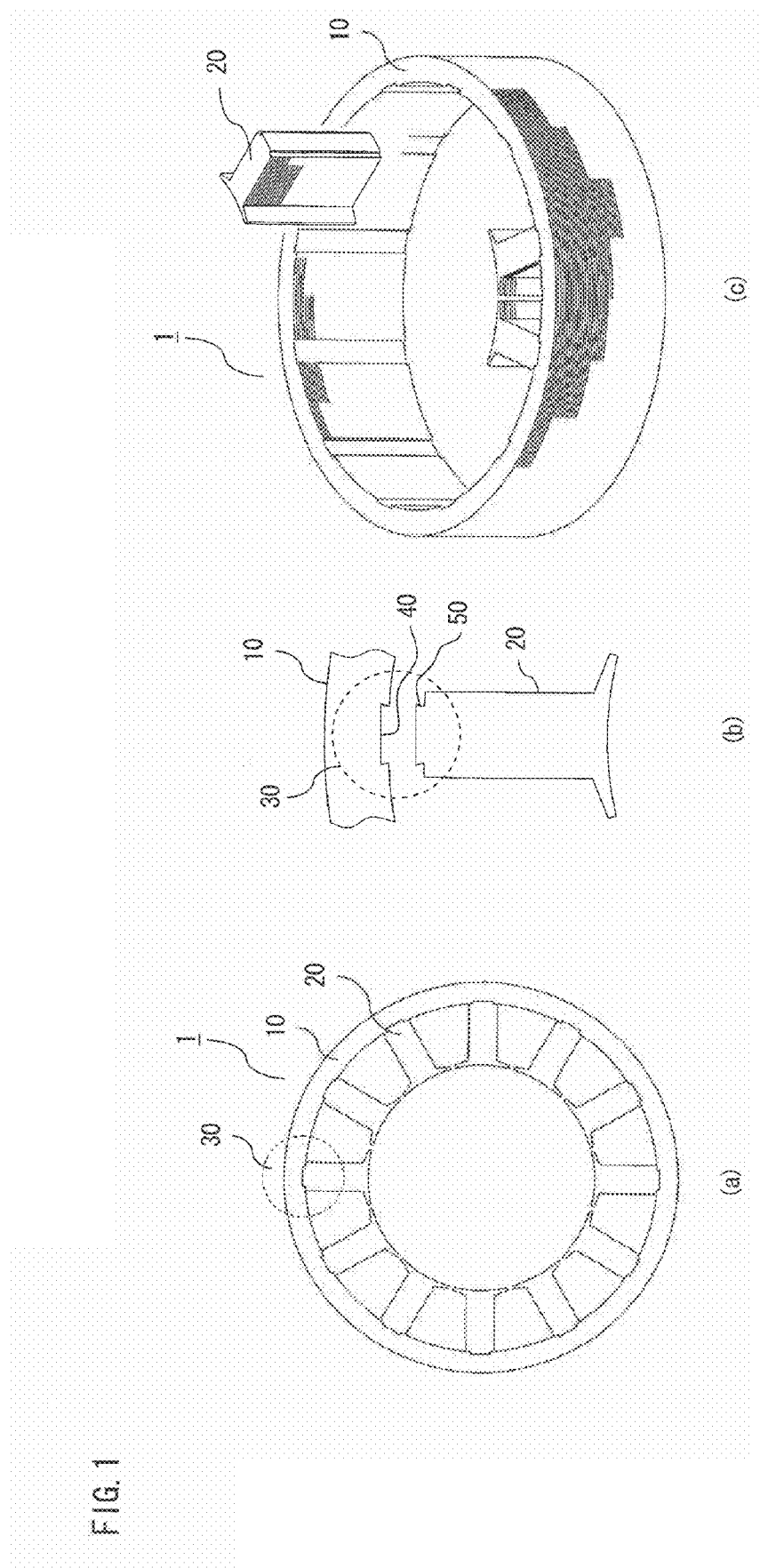
FIG. 1 is a plan view showing a stator core of a split core structure according to embodiment 1 of the invention, a detailed view showing a divided part, and a perspective view showing the whole structure of the stator core.

FIG. 1(*a*) is a plan view showing a stator core of a split core structure according to embodiment 1 of the invention, FIG. 1(*b*) is a detailed view showing a divided part of the stator core, and FIG. 1(c) is a perspective view showing the whole structure of the stator core. In FIG. 1(a), a stator core 1 of this embodiment includes a ring-shaped back yoke part 10, and plural teeth parts 20 fitted to this back yoke part 10. As shown in a divided part 30 of FIG. 1(b), a convex part 50 is provided at a root portion of the teeth part 20, and a concave part 40 corresponding to the convex part 50 is provided on an inner peripheral part of the back yoke part 10. Besides, as shown in FIG. 1(c), the ring-shaped back yoke part 10 is constructed by laminating back yoke pieces made of silicon steel plates or the like in a stator axial direction, the teeth part 20 is constructed by laminating teeth pieces made of silicon steel plates or the like in the stator axial direction, and the respective laminated plates are integrated by caulking, welding, bonding or the like. After a winding is wound around each of the laminated teeth parts 20, the convex part 50 of each of the teeth parts 20 is inserted into the concave part 40 of the back yoke part 10 from a lamination horizontal direction, and further, the convex part 50 of each of the teeth parts 20 is press-inserted into the concave part 40 of the back yoke part 10 toward a lamination direction, so that the stator core 1 is assembled. Incidentally, the illustration of the winding wound around the teeth part 20 is omitted.

Figure 2:
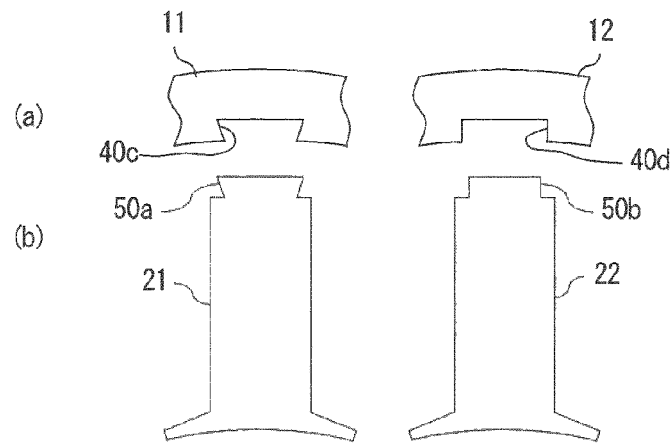
FIG. 2 is a detail view showing a concave part of a back yoke piece and a convex part of a teeth piece according to embodiment 1 of the invention.

FIG. 2 is a detailed view showing a concave part of a back yoke piece and a convex part of a teeth piece. In this embodiment, as shown in FIG. 2(a), two kinds of back yoke pieces are provided. They are, a back yoke piece 11 having a dovetail groove-shaped concave part 40c in a section perpendicular to the stator axial direction, and a back yoke piece 12 having a concave part 40d having sides substantially parallel to each other in the shaft direction in the section perpendicular to the stator axial direction. Besides, as shown in FIG. 2(b), two kinds of teeth pieces are provided. One is a teeth piece 21 having a dovetail-shaped, in the section perpendicular to the stator axial direction, convex part 50a which fits in the dovetail groove-shaped concave part 40c. And the other is a teeth piece 22 having a convex part 50b which has sides substantially parallel to each other in the shaft direction in the section perpendicular to the stator axial direction.

Figure 3:
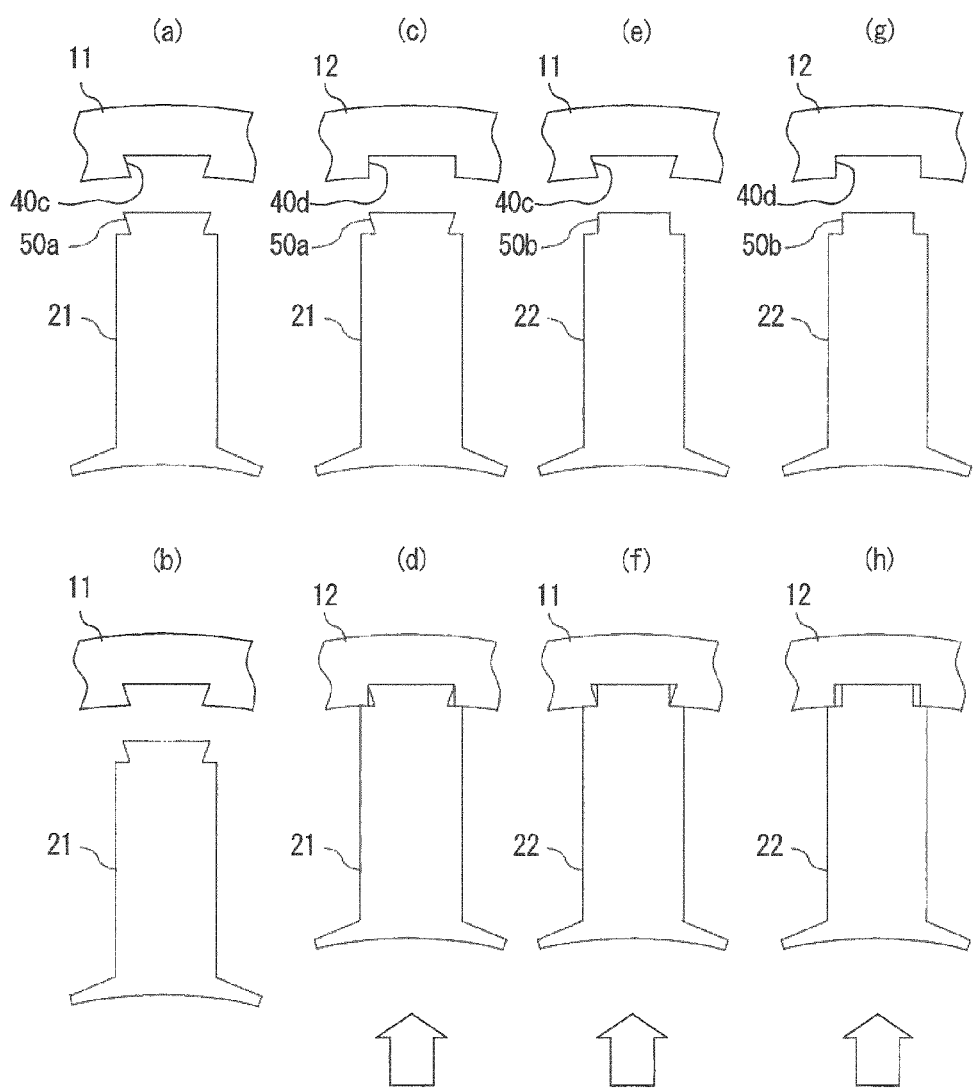
FIG. 3 is a detailed view showing a state of putting the concave part of the back yoke piece and the convex part of the teeth piece together according to embodiment 1 of the invention.

FIG. 3 is a detailed view showing a state of putting the concave part of the back yoke piece and the convex part of the teeth piece together according to this embodiment. As shown in FIGS. 3(a) and 3(b), although the dovetail-shaped convex part 50a of the teeth piece 21 can be press-fitted into the dovetail groove-shaped concave part 40c of the back yoke piece 11 from the lamination direction, it can not be inserted from the lamination horizontal direction. Besides, as shown in FIGS. 3(c) and 3(d), the dovetail-shaped convex part 50a of the teeth piece 21 can be inserted into the concave part 40d of the back yoke piece 12 from the lamination horizontal direction. Besides, as shown in FIGS. 3(e) and 3(f), the convex part 50b of the teeth piece 22 can be inserted into the dovetail groove-shaped concave part 40c of the back yoke piece 11 from the lamination horizontal direction. Besides, as shown in FIGS. 3(g) and 3(h), the convex part 50b of the teeth piece 22 can be inserted into the concave part 40d of the back yoke piece 12 from the lamination horizontal direction.

Figure 4:
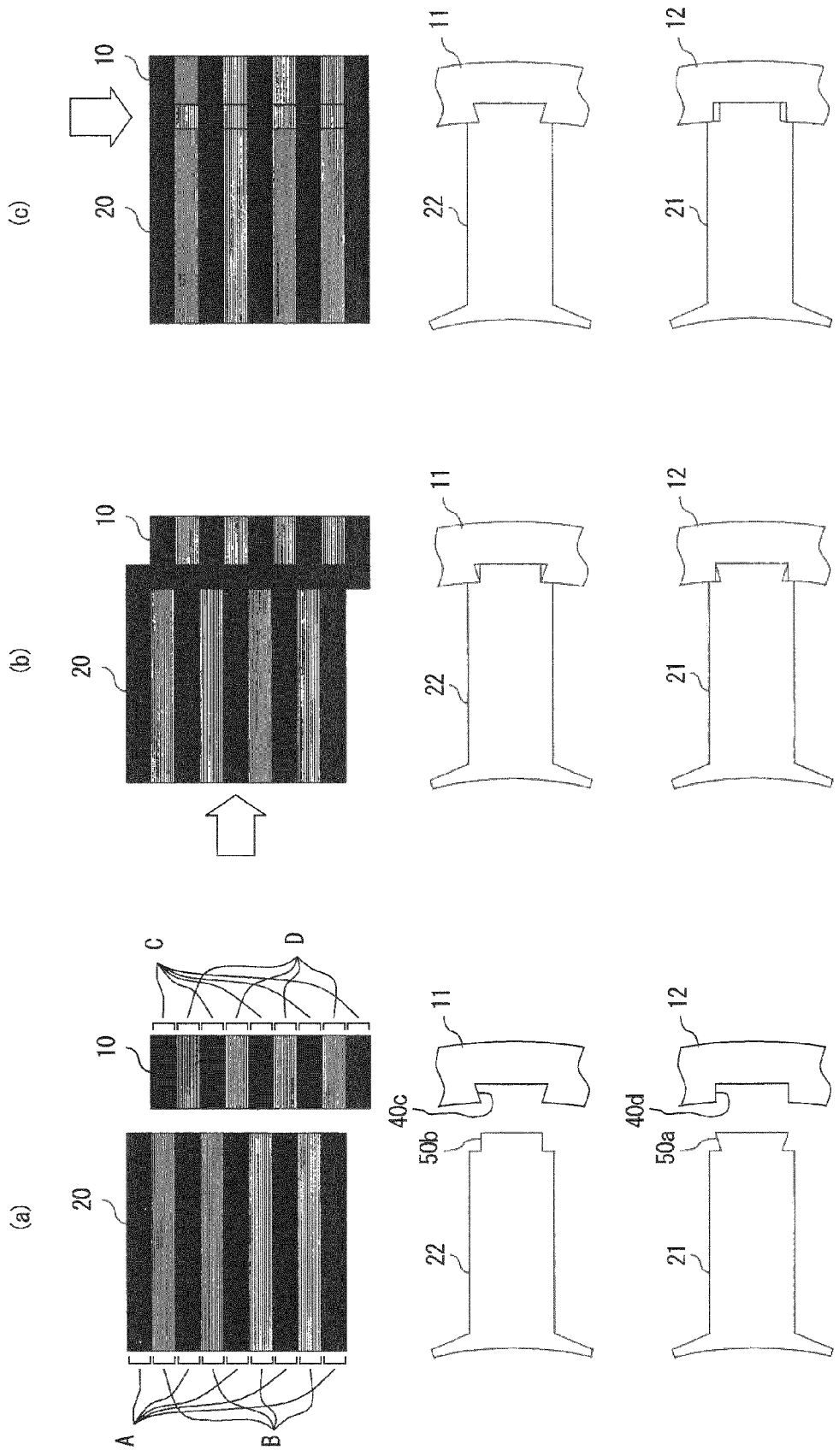
FIG. 4 is a view showing a laminated structure of a back yoke part and a teeth part according to embodiment 1 of the invention and an assembly method of the stator core by combination of the back yoke part and the teeth part.

FIG. 4 is a view showing a laminated structure of the back yoke part and the teeth part according to this embodiment, and an assembly method of the stator core by the combination of the back yoke part and the teeth part. As shown in FIG. 4(a), N teeth pieces 21 each having the dovetail-shaped convex part 50a are laminated to form a first laminated group A, N teeth pieces 22 each having the convex part 50b are laminated to form a second laminated group B, and the first laminated group A and the second laminated group B are alternately disposed and are integrated by caulking or the like, so that the teeth part 20 is constructed. Besides, N back yoke pieces 11 each having the dovetail groove-shaped concave part 40c are laminated to form a third laminated group C, N back yoke pieces 12 each having the concave part 40d are laminated to form a fourth laminated group D, and the third laminated group C and the fourth laminated group D are alternately disposed and are integrated by caulking or the like, so that the back yoke part 10 is constructed. Incidentally, here, thicknesses of the teeth pieces 21 and 22 and the back yoke pieces 11 and 12 are equal to one another.

Then, as shown in FIG. 4(a), the teeth part 20 (first laminated body) is shifted from the back yoke part 10 (second laminated body) by a distance of the N pieces in the lamination direction (upward in the drawing), and is brought to the position where the teeth part 20 can be inserted into the back yoke part 10 from the lamination horizontal direction. That is, the first laminated group A of the teeth part 20 is brought to the position of the fourth laminated group D of the back yoke part 10, and the second laminated group B of the teeth part 20 is brought to the position of the third laminated group C of the back yoke part 10. Then, as shown in FIG. 4(b), the teeth part 20 is moved in the lamination horizontal direction, so that the convex part 50a of the first laminated group A of the teeth part 20 is inserted into the concave part 40d of the fourth laminated group D of the back yoke part 10, and the convex part 50b of the second laminated group B of the teeth part 20 is inserted into the concave part 40c of the third laminated group C of the back yoke part 10. Thereafter, as shown in FIG. 4(c), the teeth part 20 and the back yoke part 10 are relatively moved in the lamination direction, and the dovetail-shaped convex part 50a of the first laminated group A of the teeth part 20 is press-fitted in the dovetail groove-shaped concave part 40c of the third laminated group C of the back yoke part 10. The stator core assembled in this way has a state in which the laminated groups (the first laminated group A and the third laminated group C) which are press-fitted to each other and the laminated groups (the second laminated group B and the fourth laminated group D) which are in the inserted state are alternately disposed.

As described above, according to this embodiment, when the split core is assembled, the concave part and the convex part have only to be press-inserted from the lamination direction by the distance shorter than the total lamination thickness of the split core, and the press-fitting force can be set to be low. As a result, without much increasing the magnetic resistance loss, the assembly workability of the split core is made excellent, and the assembly accuracy of the core can be improved.

Embodiment 2

Figure 5:
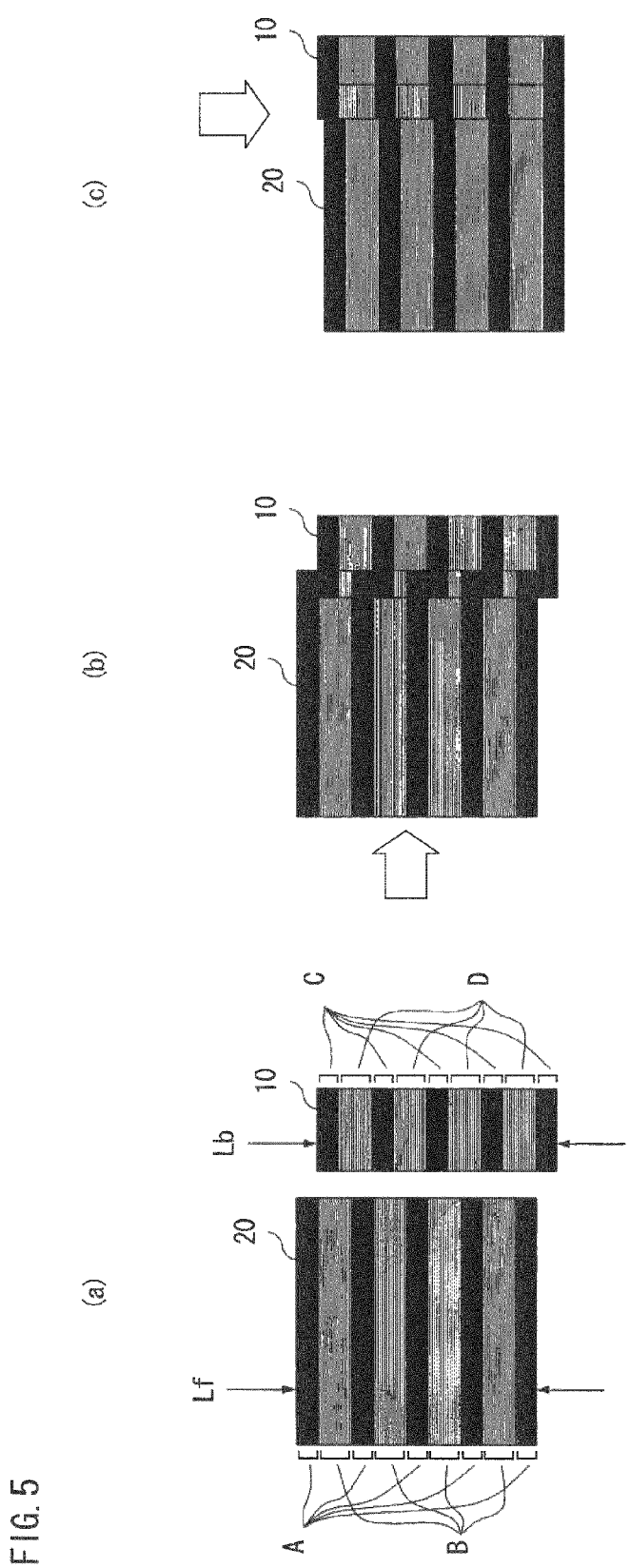
FIG. 5 is a view showing a laminated structure of a back yoke part and a teeth part according to embodiment 2 of the invention and an assembly method of a stator core by combination of the back yoke part and the teeth part.

FIG. 5 is a view showing a laminated structure of a back yoke part and a teeth part according to embodiment 2 of the invention, and an assembly method of a stator core by combination of the back yoke part and the teeth part.

In this embodiment, back yoke pieces 11 and 12 and teeth pieces 21 and 22 having the same shapes as those shown in FIG. 2 and FIG. 3 are used, and the number of laminations are changed. That is, as shown in FIG. 5(a), Na teeth pieces 21 each having a dovetail-shaped convex part 50a are laminated to form a first laminated group A, and teeth pieces 22 each having the convex part 50b are laminated to form a second laminated group B, and the first laminated group A and the second laminated group B are alternately disposed and are integrated by caulking or the like, so that a teeth part 20 is constructed. Besides, back yoke pieces 11 each having a dovetail groove-shaped concave part 40c are laminated to form a third laminated group C, N back yoke pieces 12 each having a concave part 40d are laminated to form a fourth laminated group D, and the third laminated group C and the fourth laminated group D are alternately disposed and are integrated by caulking or the like, so that a back yoke part 10 is constructed. The number Na of laminations of the first laminated group A is set to be smaller than the number N of laminations of the fourth laminated group D (Na<N).

Incidentally, in this embodiment, It shows the case where the thickness of the teeth piece used for the teeth part 20 is thinner than the thickness of the back yoke piece used for the back yoke part 10. And the thickness Lt of the teeth part 20 in the lamination direction is smaller than the thickness Lb of the back yoke part 10 in the lamination direction.

Then, as shown in FIG. 5(a), the teeth part 20 (first laminated body) is shifted by the distance of the Na pieces from the back yoke part 10 (second laminated body) in the lamination direction (shifted upward in the drawing), and is brought to the position where the teeth part 20 can be inserted into the back yoke part 10 from the lamination horizontal direction. That is, the first laminated group A of the teeth part 20 is brought to the position of the fourth laminated group D of the back yoke part 10, and the second laminated group B of the teeth part 20 is brought to the position of the third laminated group C of the back yoke part 10. Then, as shown in FIG. 5(b), the teeth part 20 is moved in the lamination horizontal direction, the convex part 50a of the first laminated group A of the teeth part 20 is inserted into the concave part 40d of the fourth laminated group D of the back yoke part 10, and the convex part 50b of the second laminated group B of the teeth part 20 is inserted into the concave part 40c of the third laminated group C of the back yoke part 10. Thereafter, as shown in FIG. 5(c), the teeth part 20 and the back yoke part 10 are press-inserted in the lamination direction, and the dovetail-shaped convex part 50a of the first laminated group A of the teeth part 20 is fitted into the dovetail groove-shaped concave part 40c of the third laminated group C of the back yoke part 10. The stator core assembled in this way has a state in which the laminated groups (the first laminated group A and the third laminated group C) press-fitted and the laminated groups (the second laminated group B and the fourth laminated group D) in the inserted state are alternately disposed.

As described above, in this embodiment, the first laminated group A is constructed by laminating the Na core pieces, the fourth laminated group D is constructed by laminating the N core pieces having the same thickness, and Na<N is established, and therefore, even if the lamination direction positions of the laminated groups which becomes a pair at the time of assembly and insertion are shifted due to the deviation of the thickness of the core piece, the gap difference between laminations, and the deterioration of assembly accuracy, the assembly and insertion can be certainly performed.

Besides, similarly to the embodiment 1, when the split core is assembled, the concave part and the convex part have only to be press-inserted from the lamination direction by the distance shorter than the total lamination thickness of the split core, and the press-fitting force can be set to be low. As a result, without much increasing the magnetic resistance loss in the divided part, the assembly workability of the split core and the assembly accuracy of the core can be improved.

Embodiment 3

Figure 6:
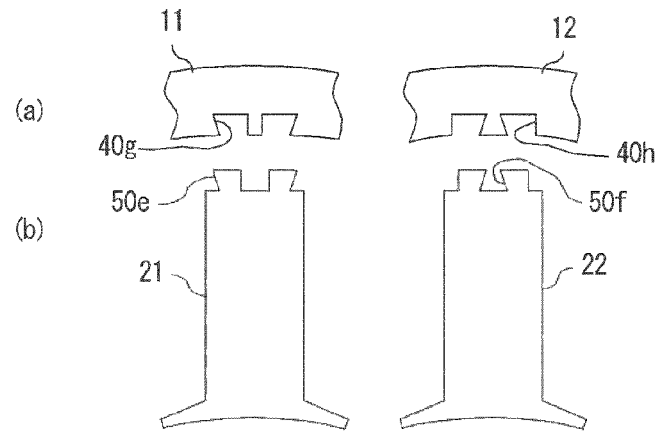
FIG. 6 is a detailed view showing a concave part of a back yoke piece and a convex part of a teeth piece according to embodiment 3 of the invention.

FIG. 6 is a detailed view showing a concave part of a back yoke piece and a convex part of a teeth piece according to embodiment 3 of the invention. In this embodiment, as shown in FIG. 6(a), two kinds of back yoke pieces are provided, one is a back yoke piece 11 having a pair of outside dovetail groove-shaped concave parts 40g in which both outer sides widen toward the outside in an axial direction. And the other is a back yoke piece 12 having a pair of inside dovetail groove-shaped concave parts 40h in which both inner sides narrows toward the outside in the axial direction. Besides, as shown in FIG. 6(b), there are two kinds of teeth pieces. One is a teeth piece 21 having a pair of convex parts 50e in which both outer sides widen toward the outside in the axial direction and are press-fitted into both the outer sides of the concave part 40g. The other is a teeth piece 22 having a pair of convex part 50f in which both inner sides widen toward the outside in the axial direction and are press-fitted into the inner sides of the concave part 40h.

Figure 7:
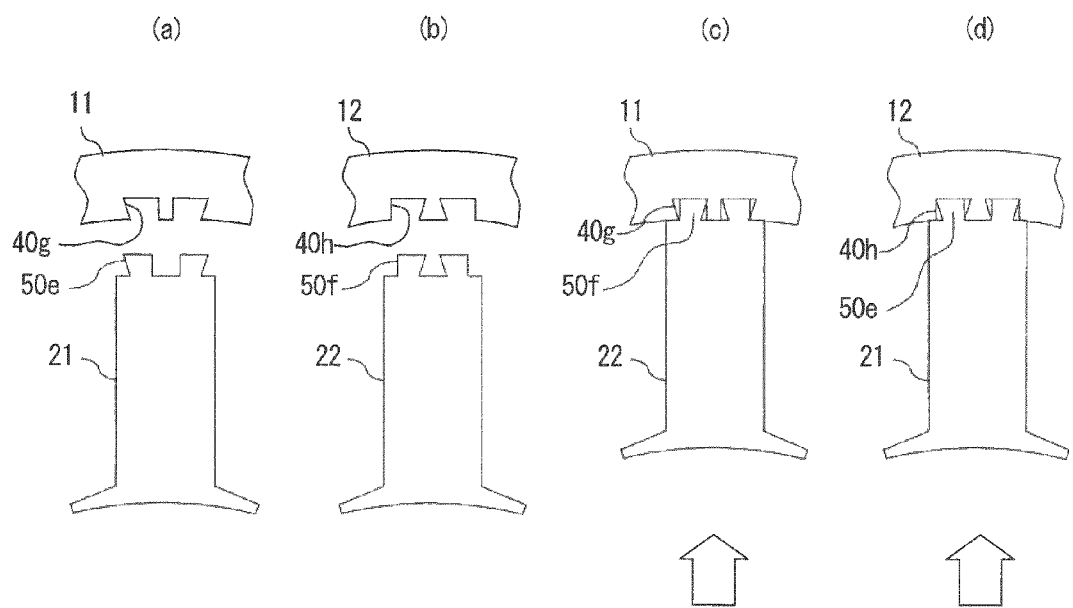
FIG. 7 is a detailed view showing a state of putting the concave part of the back yoke piece and the convex part of the teeth piece together according to embodiment 3 of the invention.

FIG. 7 is a detailed view showing a state of putting the concave part of the back yoke piece and the convex part of the teeth piece together according to this embodiment. As shown in FIG. 7(a), although the convex part 50e of the teeth piece 21 can be press-fitted into the concave part 40g of the back yoke piece 11 from the lamination direction, it can not be inserted from the lamination horizontal direction. Besides, as shown in FIG. 7(b), although the convex part 50f of the teeth piece 22 can be press-fitted into the concave part 40h of the back yoke piece 12 from the lamination direction, it can not be inserted from the lamination horizontal direction. Besides, as shown in FIG. 7(c), the convex part 50f of the teeth piece can be inserted into the concave part 40g of the back yoke piece 11 from the lamination horizontal direction. Besides, as shown in FIG. 7(d), the convex part 50e of the teeth piece can be inserted into the concave part 40h of the back yoke piece 12 from the lamination horizontal direction.

Figure 8:
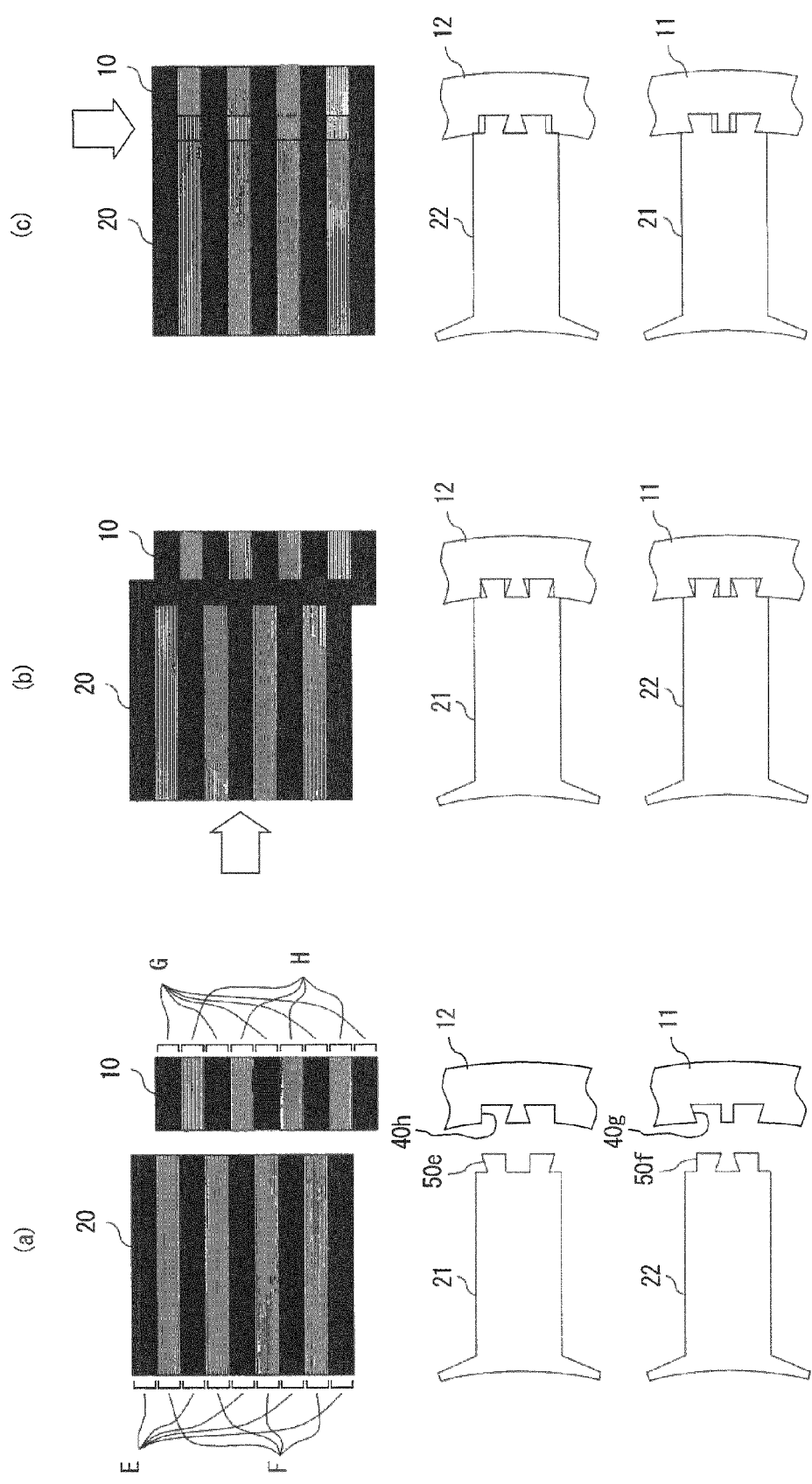
FIG. 8 is a view showing a laminated structure of a back yoke part and a teeth part according to embodiment 3 of the invention and an assembly method of a stator core by combination of the back yoke part and the teeth part.

FIG. 8 is a view showing a laminated structure of a back yoke part and a teeth part according to this embodiment, and an assembly method of the stator core using combination of the back yoke part and the teeth part. As shown in FIG. 8(a), N teeth pieces 21 each having the convex part 50e are laminated to form a first laminated group E, N teeth pieces 22 each having the convex part 50f are laminated to form a second laminated group F, and the first laminated group E and the second laminated group F are alternately disposed and are integrated by caulking or the like, so that a teeth part 20 is constructed. Besides, N back yoke pieces 11 each having the concave part 40g are laminated to form a third laminated group G, N back yoke pieces 12 each having the concave part 40h are laminated to form a fourth laminated group H, and the third laminated group G and the fourth laminated group H are alternately disposed and are integrated by caulking or the like, so that a back yoke part 10 is constructed. Incidentally, here, thicknesses of the teeth pieces 21 and 22 and the back yoke pieces 11 and 12 are equal to one another.

As shown in FIG. 8(a), the teeth part 20 (first laminated body) is shifted by the distance of the N pieces from the back yoke part 10 (second laminated body) (shifted upward in the drawing) and is brought to the position where the teeth part 20 can be inserted into the back yoke part 10 from the lamination horizontal direction. That is, the first laminated group E of the teeth part 20 is brought to the position of the fourth laminated group H of the back yoke part 10, and the second laminated group F of the teeth part 20 is brought to the position of the third laminated group G of the back yoke part 10. Then, as shown in FIG. 8(b), the teeth part 20 is moved in the lamination horizontal direction, so that the convex part 50e of the first laminated group E of the teeth part 20 is inserted into the concave part 40h of the fourth laminated group H of the back yoke part 10, and the convex part 50f of the second laminated group F of the teeth part 20 is inserted into the concave part 40g of the third laminated group G of the back yoke part 10. Thereafter, as shown in FIG. 8(c), the teeth part 20 and the back yoke part 10 are press-inserted in the lamination direction, so that both the outer sides of the dovetail-shaped convex part of the first laminated group E of the teeth part 20 are fitted into both the outer sides of the dovetail groove-shaped concave part of the third laminated group G of the back yoke part 10, and the both the inner sides of the dovetail-shaped convex part of the second laminated group F of the teeth part 20 are fitted into the inner sides of the dovetail groove-shaped concave part of the fourth laminated group H of the back yoke part 10.

As described above, according to this embodiment, the dovetail-shaped convex portions and the dovetail groove-shaped concave portions can be disposed so as to be combined all over the lamination range of the split core, the assembly workability is improved, and stronger joining becomes possible in the divided part.

Besides, similarly to the embodiment 1, when the split core is assembled, the concave part and the convex part have only to be press-inserted from the lamination direction by the distance shorter than the total lamination thickness of the split core, and the press-fitting force can be set to be low. As a result, without much increasing the magnetic resistance loss in the divided part, the assembly workability of the split core and the assembly accuracy of the core can be improved.

Embodiment 4

Figure 9:
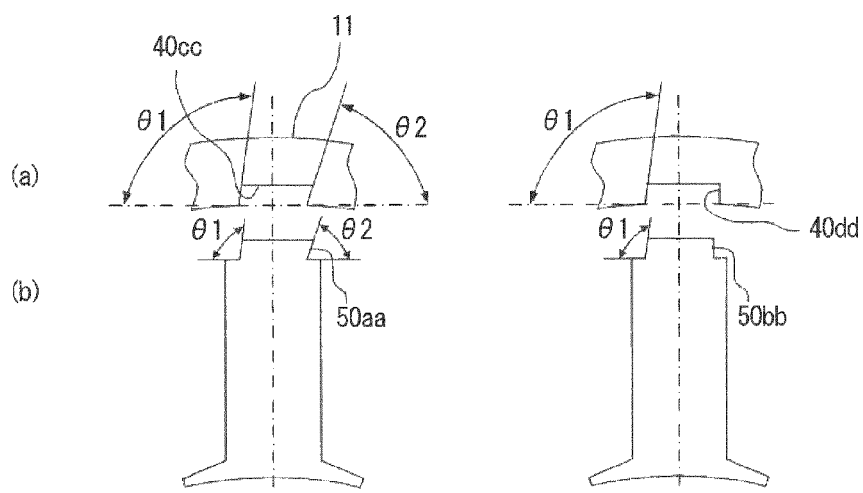
FIG. 9 is a detailed view showing a concave part of a back yoke piece and a convex part of a teeth piece according to embodiment 4 of the invention.

FIG. 9 is a detailed view showing a concave part of a back yoke piece and a convex part of a teeth piece. In this embodiment, as shown in FIG. 9(a), There are two kinds of back yoke pieces. One is a back yoke piece 11 having a concave part 40cc and the other is a back yoke piece 12 having a concave part 40dd. Besides, as shown in FIG. 9(b), there are two kinds of teeth pieces, they are, a teeth piece 21 having a convex part 50aa which is press-fitted into the concave part 40cc, and a teeth piece 22 having a convex part 50bb.

In the concave part 40cc of the back yoke piece 11, one side edge is inclined at an angle θ1 with respect to a direction perpendicular to an insertion direction and the other side edge is inclined at an angle θ2 with respect to the direction perpendicular to the insertion direction. Similarly, in the convex part 50aa of the teeth piece 21 to be press-fitted into the concave part 40cc, one side edge is inclined at the angle θ1 with respect to the direction perpendicular to the insertion direction and the other side edge is inclined by the angle θ2 with respect to the direction perpendicular to the insertion direction. Here, θ1 satisfies the condition 90 degrees≦θ1≦180 degrees, and θ2 satisfies the condition of θ2<90 degrees and θ2<180 degrees−θ1. Besides, in the concave part 40dd of the back yoke piece 12, one side edge is inclined at the angle θ1 with respect to the direction perpendicular to the insertion direction. Further, in the convex part 50bb of the teeth piece 22, one side edge is inclined at the angle θ1 with respect to the direction perpendicular to the insertion direction.

Figure 10:
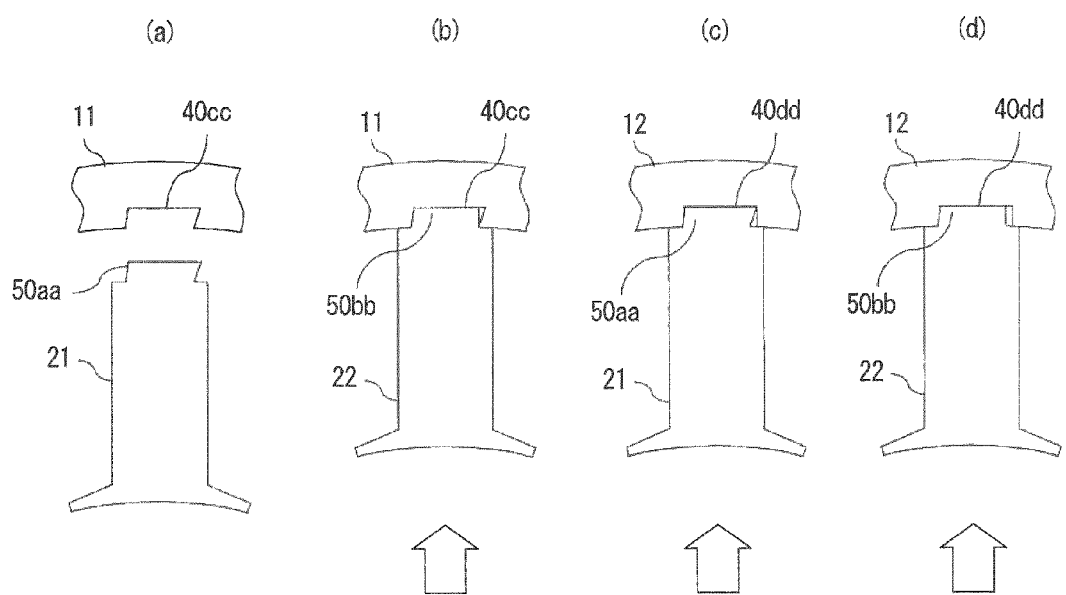
FIG. 10 is a detailed view showing a state of putting the concave part of the back yoke piece and the convex part of the teeth piece together according to embodiment 4 of the invention.

Then, as shown in FIG. 10(a), although the convex part 50aa of the teeth piece 21 can be press-fitted into the concave part 40cc of the back yoke piece 11 from the lamination direction, it can not be inserted from the lamination horizontal direction. Besides, as shown in FIG. 10(b), the convex part 50bb of the teeth piece 22 can be inserted into the concave part 40cc of the back yoke piece 11 from the lamination horizontal direction. Besides, as shown in FIG. 10(c), the convex part 50aa of the teeth piece 21 can be inserted into the concave part 40dd of the back yoke piece 12 from the lamination horizontal direction. Besides, as shown in FIG. 10(d), the convex part 50bb of the teeth piece 22 can be inserted into the concave part 40dd of the back yoke piece 12 from the lamination horizontal direction.

As described above, according to this embodiment, since the structure is made such that in the convex part and the concave part of the divided part, at least one pair of side edges facing each other at both ends of the convex parts are in close contact with each other, the close contact part without any gap can be constructed at the side edges of one side, and therefore, the positioning accuracy of the divided parts can be improved.

Besides, similarly to the above embodiment, when the split core is assembled, the concave part and the convex part have only to be press-inserted from the lamination direction by the distance shorter than the total lamination thickness of the split core, and the press-fitting force can be set to be low. As a result, without much increasing the magnetic resistance loss in the divided part, the assembly workability of the split core is made excellent, and the assembly accuracy of the core can be improved.

Embodiment 5

In the above embodiment, the example of the core divided into the ring-shaped back yoke part and the plural teeth parts has been described. The invention can be applied to a core in which a back yoke part is divided into equal parts each of which has a teeth part with back yoke part.

Figure 11:
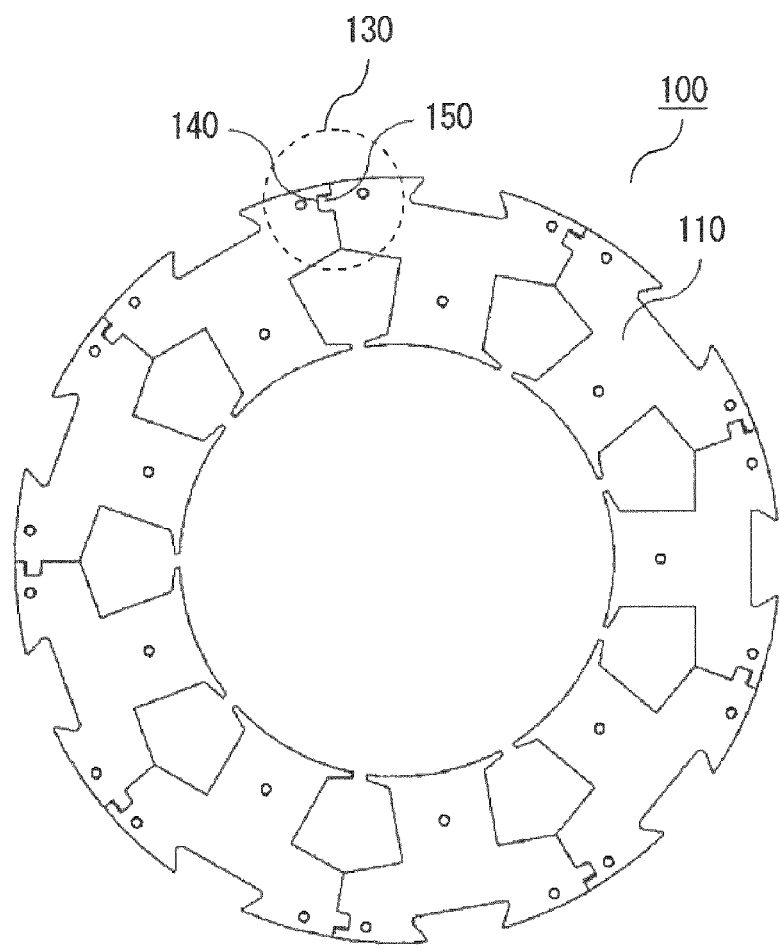
FIG. 11 is a plan view showing a stator core of a split core structure according to embodiment 5 of the invention.
Figure 12:
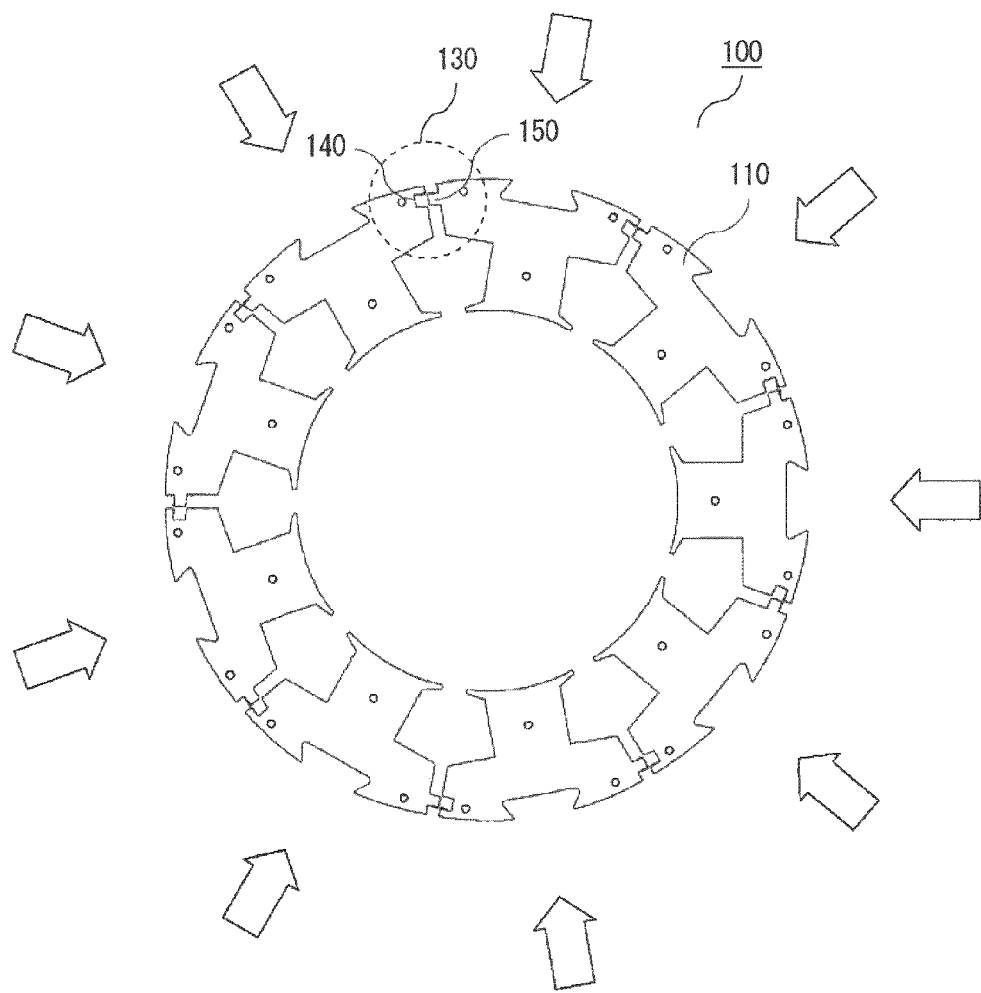
FIG. 12 is a plan view showing a state of assembly of the stator core according to embodiment 5 of the invention.

FIG. 11 is a plan view showing a stator core of a split core structure according to embodiment 5 of the invention, and FIG. 12 is a plan view showing a state of assembling the stator core of FIG. 11. As shown in FIG. 11, a stator core 100 of this embodiment includes plural equal split core parts 110 each having a teeth part with a back yoke part which is divided into equal parts, and the split core parts are respectively combined in a loop. The plural split core parts 110 are fitted to each other in such a manner that a concave part 140 and a convex part 150 mutually formed in a divided part 130 are combined with each other. That is, as shown in FIG. 12, the respective split core parts 110 are made to simultaneously approach toward the axial center direction from positions where they are respectively shifted in the lamination direction, so that the concave and convex shapes of the split core piece 110 are inserted. Then, press insertion and fitting in the lamination direction is performed so that the integrated stator core is obtained. In the split core part 110, split core pieces made of silicon steel plates or the like are laminated in the stator axial direction, and the laminated plates are integrated by caulking, welding, bonding or the like.

Figure 13:
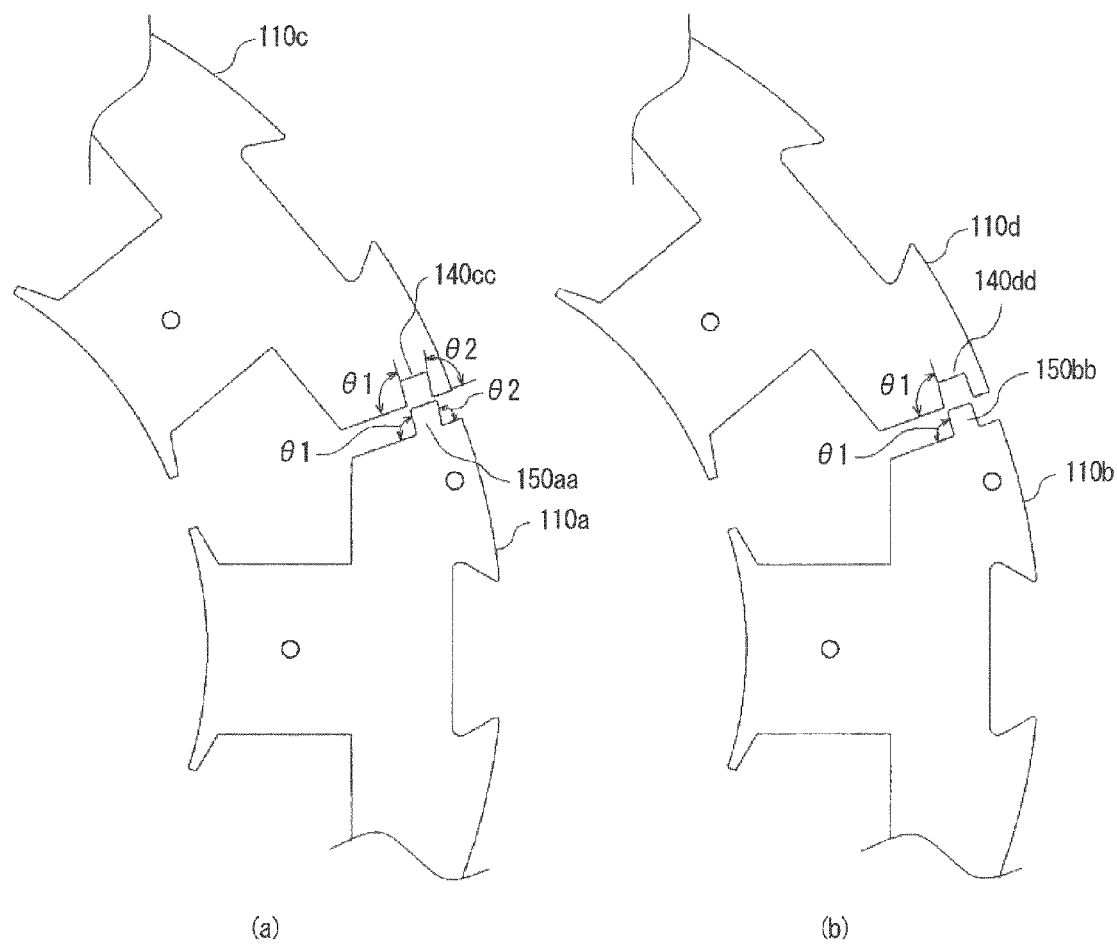
FIG. 13 is a view showing details of concave and convex parts of a split core part according to embodiment 5 of the invention.

FIG. 13 is a view showing details of the concave and convex parts of the split core of this embodiment. In FIG. 13, similarly to FIG. 9, in a concave part 140cc of a split core piece 110c, one side edge is inclined at an angle θ1 with respect to a direction perpendicular to an insertion direction, and the other side edge is inclined at an angle θ2 with respect to the direction perpendicular to the insertion direction. Similarly, in a convex part 150aa of a split core piece 110a to be press-fitted into the concave part 140cc, one side edge is inclined at the angle θ1 with respect to the direction perpendicular to the insertion direction, and the other side edge is inclined at the angle θ2 with respect to the direction perpendicular to the insertion direction. Here, θ1 satisfies the condition of 90 degrees≦θ1≦180 degrees, and θ2 satisfies the condition of θ2<90 degrees and θ2<180 degrees−θ1.

Besides, although the convex part 150aa of the split core piece 110a can be press-fitted into the concave part 140cc of the split core piece 110c from the lamination direction, it can not be inserted from the lamination horizontal direction.

Besides, the convex part 150bb of the split core piece 110b can be inserted into the concave part 140cc of the split core piece 110c from the lamination horizontal direction. Besides, the convex part 150aa of the split core piece 110a can be inserted into the concave part 140dd of the split core piece 110d from the lamination horizontal direction. Besides, the convex part 150bb of the split core piece 110b can be inserted into the concave part 140dd of the split core piece 110d from the lamination horizontal direction.

Figure 14:
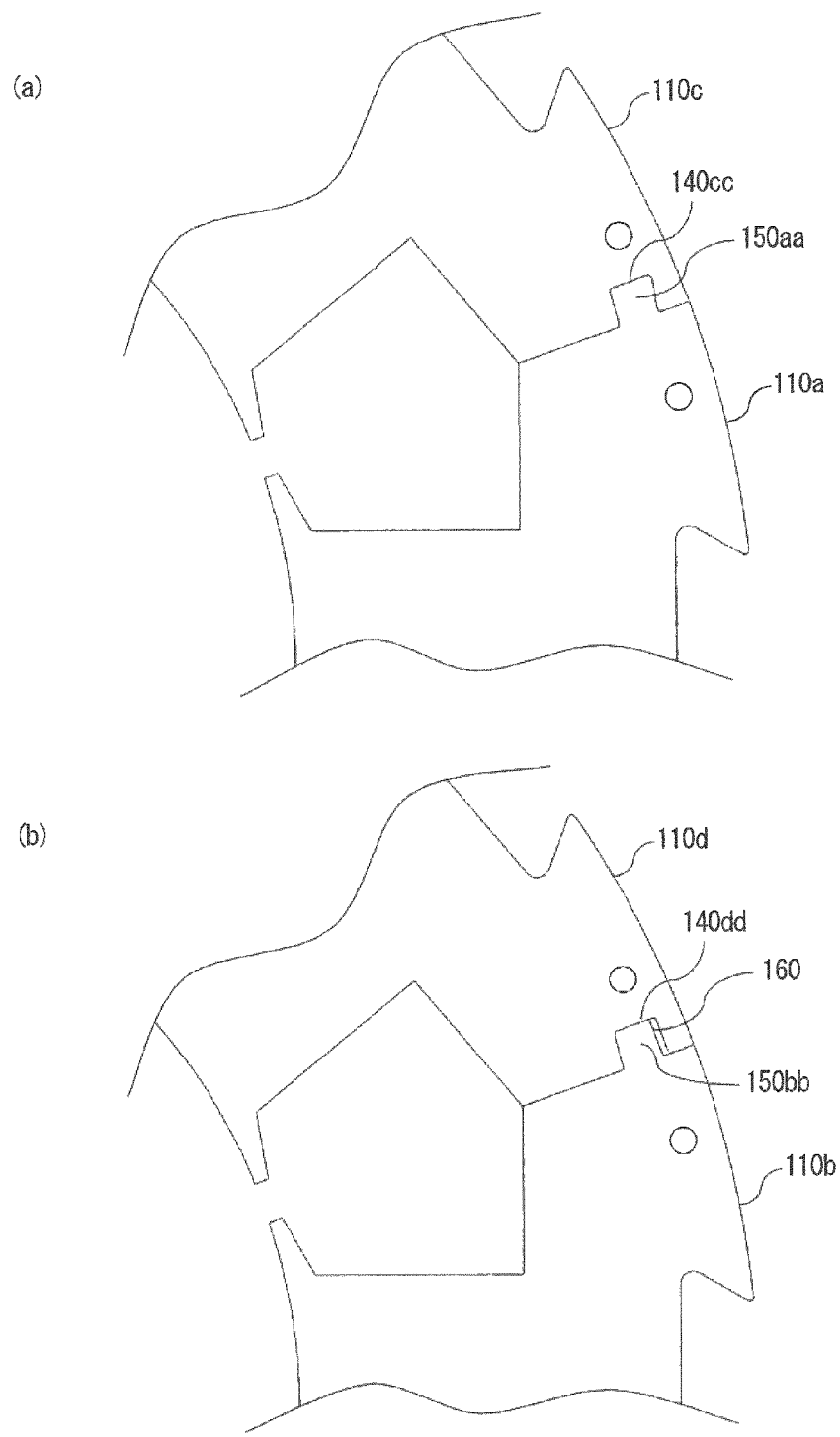
FIG. 14 is a view showing details of a fitting state of the concave and convex parts of the split core part according to embodiment 5 of the invention.

Then, as shown in FIG. 14, the convex part 150aa of the split core piece 110a is brought into the place where 150aa is press-fitted in the concave part 140cc of the split core piece 110c with no gap between them. Besides, the convex part 150bb of the split core piece 110b is brought into the place where 150bb is inserted in the concave part 140dd of the split core piece 110d and the inside of the core is brought into the close contact state without any gap, and a gap 160 occurs only at the outside of the core.

As described above, according to this embodiment, also with respect to the core divided into equal shaped parts each having a teeth part and a part of a back yoke part, the concave part and the convex part have only to be press-inserted from the lamination direction by the distance shorter than the total lamination thickness of the split core, and the press-fitting force can be set to be low. As a result, without much increasing the magnetic resistance loss in the divided part, the assembly workability of the split core and the assembly accuracy of the core can be improved.

Besides, because the gaps which appear as a result of the combination of the concave and the convex parts are arranged at the outer peripheral side of the core, the gap parts having high magnetic resistance at the inner peripheral side through which a high magnetic flux passes are not disposed, and therefore, the split core with a low loss can be constructed.

Incidentally, in the embodiment, although the example has been described in which the concave and the convex shapes of the embodiment 4 are adopted for the split core having the teeth part and a part of the back yoke part, similar effects can be obtained also when the concave and the convex shapes of the embodiment 1 to the embodiment 3 are adopted.

INDUSTRIAL APPLICABILITY

The invention is available for a core of an electric rotating machine and a linear motor.

The invention claimed is:

1. A split core including a first laminated body and a second laminated body joined each other using a combination of concave and convex parts of the first laminated body and the second laminated body, wherein:
   the first laminated body includes a first laminated group having a convex part and a second laminated group having a convex part, which are alternately disposed,
   the second laminated body includes a third laminated group having a concave part and a fourth laminated group having a concave part, which are alternately disposed,
   the convex part of the first laminated group has a shape that the convex part can not be inserted into the concave part of the third laminated group from a lamination horizontal direction and can be inserted into the concave part of the fourth laminated group from the lamination horizontal direction,
   the convex part of the second laminated group has a shape that the convex part can be inserted into the concave part of the third laminated group and the concave part of the fourth laminated group from the lamination horizontal direction, and
   the convex part of the first laminated group is press-inserted in the concave part of the third laminated group, and the convex part of the second laminated group is inserted in the concave part of the fourth laminated group.

2. The split core according to claim 1, wherein one of the first laminated body and the second laminated body is a ring-shaped back yoke part, and the other of the first laminated body and the second laminated body is a teeth part.

3. The split core according to claim 1, wherein a back yoke part is divided, and each of the first laminated body and the second laminated body is a laminated body including a teeth part and the divided back yoke part.

4. The split core according to claim 1, wherein each of the first laminated group, the second laminated group, the third laminated group, and the fourth laminated group includes N core pieces having same thicknesses.

5. The split core according to claim 1, wherein the first laminated group includes Na core pieces, the fourth laminated group includes N core pieces, one core piece of the first laminated group having the same thickness as one core piece of the fourth laminated group, and Na<N is established.

6. The split core according to claim 1, wherein, in the concave part and the convex part, one pair of side edges facing each other at both ends of the parts are in close contact with each other.

7. The split core according to claim 1, wherein each of the first laminated body and the second laminated body is a laminated body which has a back yoke part divided and which includes a teeth part, and in the concave part and the convex part, one pair of side edges facing each other at both ends of the parts are in close contact with each other, and the close contact part is disposed at an inner peripheral side of the core.

8. The split core according to claim 2, wherein a winding is wound around the teeth part.

9. The split core according to claim 3, wherein a winding is wound around the teeth part.

10. A split core including a first laminated body and a second laminated body joined each other using a combination of concave and convex parts of the first laminated body and the second laminated body, wherein:
   the first laminated body includes a first laminated group having a convex part and a second laminated group having a convex part, which are alternately disposed,
   the second laminated body includes a third laminated group having a concave part and a fourth laminated group having a concave part, which are alternately disposed,
   the convex part of the first laminated group has a shape that the convex part can not be inserted into the concave part of the third laminated group from a lamination horizontal direction and can be inserted into the concave part of the fourth laminated group from the lamination horizontal direction,
   the convex part of the second laminated group has a shape that the convex part can be inserted into the concave part of the third laminated group from the lamination horizontal direction and can not be inserted into the concave part of the fourth laminated group from the lamination horizontal direction, and
   the convex part of the first laminated group is press-inserted in the concave part of the third laminated group, and the convex part of the second laminated group is press-inserted in the concave part of the fourth laminated group.

11. The split core according to claim 10, wherein one of the first laminated body and the second laminated body is a ring-shaped back yoke part, and the other of the first laminated body and the second laminated body is a teeth part.

12. The split core according to claim 10, wherein a back yoke part is divided, and each of the first laminated body and the second laminated body is a laminated body including a teeth part and the divided back yoke part.

13. The split core according to claim 10, wherein each of the first laminated group, the second laminated group, the third laminated group, and the fourth laminated group includes N core pieces having same thicknesses.

14. The split core according to claim 10, wherein
the third laminated group includes the concave part which has a pair of concave portions and of which outer side edges at both sides are dovetail groove-shaped,
the fourth laminated group includes the concave part which has a pair of concave portions and of which inner side edges are dovetail groove-shaped,
the first laminated group includes the convex part which has a pair of convex portions and of which dovetail-shaped outer side edges at both sides are press-fitted into the dovetail groove-shaped outer side edges at both the sides of the concave part of the third laminated group, and the second laminated group includes the convex part which has a pair of convex portions and of which dovetail-shaped inner side edges are press-fitted into the dovetail groove-shaped inner side edges of the concave part of the fourth laminated group.

15. The split core according to claim 10, wherein, in the concave part and the convex part, one pair of side edges facing each other at both ends of the parts are in close contact with each other.

16. The split core according to claim 10, wherein each of the first laminated body and the second laminated body is a laminated body which has a back yoke part divided and which includes a teeth part, and in the concave part and the convex part, one pair of side edges facing each other at both ends of the parts are in close contact with each other, and the close contact part is disposed at an inner peripheral side of the core.

17. The split core according to claim 11, wherein a winding is wound around the teeth part.

18. The split core according to claim 12, wherein a winding is wound around the teeth part.

19. A manufacturing method of a split core including a first laminated body and a second laminated body joined each other using a combination of concave and convex parts of the first laminated body and the second laminated body, wherein:
the first laminated body is formed by alternately disposing a first laminated group having a convex part and a second laminated group having a convex part,
the second laminated body is formed by alternately disposing a third laminated group having a concave part and a fourth laminated group having a concave part,
the convex part of the first laminated group has a shape that the convex part can not be inserted into the concave part of the third laminated group from a lamination horizontal direction and can be inserted into the concave part of the fourth laminated group from the lamination horizontal direction,
the convex part of the second laminated group has a shape that the convex part can be inserted into the concave part of the third laminated group and the concave part of the fourth laminated group from the lamination horizontal direction, and
the manufacturing method of the split core comprising:
inserting the convex part of the first laminated group into the concave part of the fourth laminated group from the lamination horizontal direction, and inserting the convex part of the second laminated group into the concave part of the third laminated group from the lamination horizontal direction; and
press-inserting the convex part of the first laminated group into the concave part of the third laminated group from a lamination direction, and inserting the convex part of the second laminated group into the concave part of the fourth laminated group from the lamination direction.

20. A manufacturing method of a split core including a first laminated body and a second laminated body joined each other using a combination of concave and convex parts of the first laminated body and the second laminated body, wherein:
the first laminated body is formed by alternately disposing a first laminated group having a convex part and a second laminated group having a convex part,
the second laminated body is formed by alternately disposing a third laminated group having a concave part and a fourth laminated group having a concave part,
the convex part of the first laminated group has a shape that the convex part can not be inserted into the concave part of the third laminated group from a lamination horizontal direction and can be inserted into the concave part of the fourth laminated group from the lamination horizontal direction,
the convex part of the second laminated group has a shape that the convex part can be inserted into the concave part of the third laminated group from the lamination horizontal direction and can not be inserted into the concave part of the fourth laminated group from the lamination horizontal direction, and
the manufacturing method of the split core comprising:
inserting the convex part of the first laminated group into the concave part of the fourth laminated group from the lamination horizontal direction, and inserting the convex part of the second laminated group into the concave part of the third laminated group from the lamination horizontal direction; and
press-inserting the convex part of the first laminated group into the concave part of the third laminated group from a lamination direction, and press-inserting the convex part of the second laminated group into the concave part of the fourth laminated group from the lamination direction.

* * * * *